United States Patent [19]
Clayton et al.

[11] Patent Number: 4,797,774
[45] Date of Patent: Jan. 10, 1989

[54] SIGNAL CONDITIONING CIRCUIT

[75] Inventors: Wilson A. Clayton, La Habra; Algis P. J. Babilius, Diamond Bar, both of Calif.

[73] Assignee: General Signal Corporation, Stamford, Conn.

[21] Appl. No.: 913,825

[22] Filed: Sep. 30, 1986

[51] Int. Cl.$^4$ .......................... H02H 3/08; H02H 3/20
[52] U.S. Cl. .......................................... 361/86; 361/87
[58] Field of Search .................. 361/86, 87, 91, 93, 361/170, 179, 1, 18; 323/357, 358, 909; 324/127, 115; 328/5; 363/50, 59, 6, 63, 80

[56] References Cited

U.S. PATENT DOCUMENTS

| | | | |
|---|---|---|---|
| 4,278,940 | 7/1981 | Milkovic | 323/357 X |
| 4,346,332 | 8/1982 | Walden | 363/80 X |
| 4,453,193 | 6/1984 | Huang et al. | 363/50 X |
| 4,475,151 | 10/1984 | Philipp | 363/63 |

FOREIGN PATENT DOCUMENTS 1051598  10/1983  U.S.S.R. ................ 323/357

Primary Examiner—Roy N. Envall, Jr.
Assistant Examiner—Derek S. Jennings
Attorney, Agent, or Firm—Harold Huberfeld; Jeffrey S. Mednick

[57] ABSTRACT

A signal conditioning circuit including power terminals adapted to be connected to a direct current power source, sensor terminals adapted to receive a direct current signal from at least one electrical sensing device and output terminals adapted to be connected to an electrical resistance. The conditioning circuit includes an inverter connected to the power terminals for generating an output signal of opposite polarity to the signal received at the power terminals. An adjustment mechanism is connected to the output terminals for receiving the inverter output signal and adjusting the magnitude of the signal received at the sensor terminals to a desired level. In a second mode of operation, the circuit includes a second set of sensor terminals and the adjustment mechanism operates to deliver an output signal proportional to the difference between the signals received at both the first and second sensor terminals.

14 Claims, 2 Drawing Sheets

SIGNAL CONDITIONING CIRCUIT

BACKGROUND OF THE INVENTION

The present invention relates generally to an electronic circuit for conditioning a direct current input signal and more particularly to such a circuit for conditioning a single direct current input signal or conditioning the difference between two direct current input signals.

It has been a known practice to couple various sensors to current transmitters to deliver a control signal or indicator signal typically utilized in some system control. For example, temperature and humidity sensors have typically been coupled to transmitters having an output range from 4 to 20 mA. Occasionally, instruments and process controllers adapted to receive such a signal require that such a signal be shifted and/or expanded or reduced in range. In the past in order to solve this problem specially designed transmitters have been utilized. In addition, in certain applications, it is desired to obtain the difference between two transmitter outputs. In such instances, special differential transformers have been utilized to obtain the desired readings. The above noted solutions have been somewhat awkward and costly.

SUMMARY OF THE INVENTION

Accordingly, a signal conditioning circuit has been provided which includes power terminals adapted to be connected to a direct current power source, sensor terminals adapted to receive a direct current signal from at least one electrical sensing device and output terminals adapted to be connected to an electrical resistance. The conditioning circuit includes an inverter connected to the power terminals for generating an output signal of opposite polarity to the signal received at the power terminals. An adjustment mechanism is connected to the output terminals for receiving the inverter output signal and adjusting the scale of the signal received at the sensor terminals to a desired scale. In a second mode of operation the circuit includes a second set of sensor terminals and the adjustment mechanism operates to deliver an output signal proportional to the difference between the signals received at both the first and the second sensor terminals.

OBJECTS OF THE INVENTION

An object of the present invention is the provision of a signal conditioning circuit which is capable of shifting a direct current input to a desired output range.

Another object of the present invention is the provision of a signal conditioning circuit which may be easily calibrated by the operator to obtain a desired range of voltage output.

A further object of the present invention is the provision of a signal conditioning circuit capable of developing an output signal equal to the difference of two input signals.

Still another object of the present invention is the provision of a signal conditioning circuit which is relatively simple in construction and inexpensive to manufacture.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
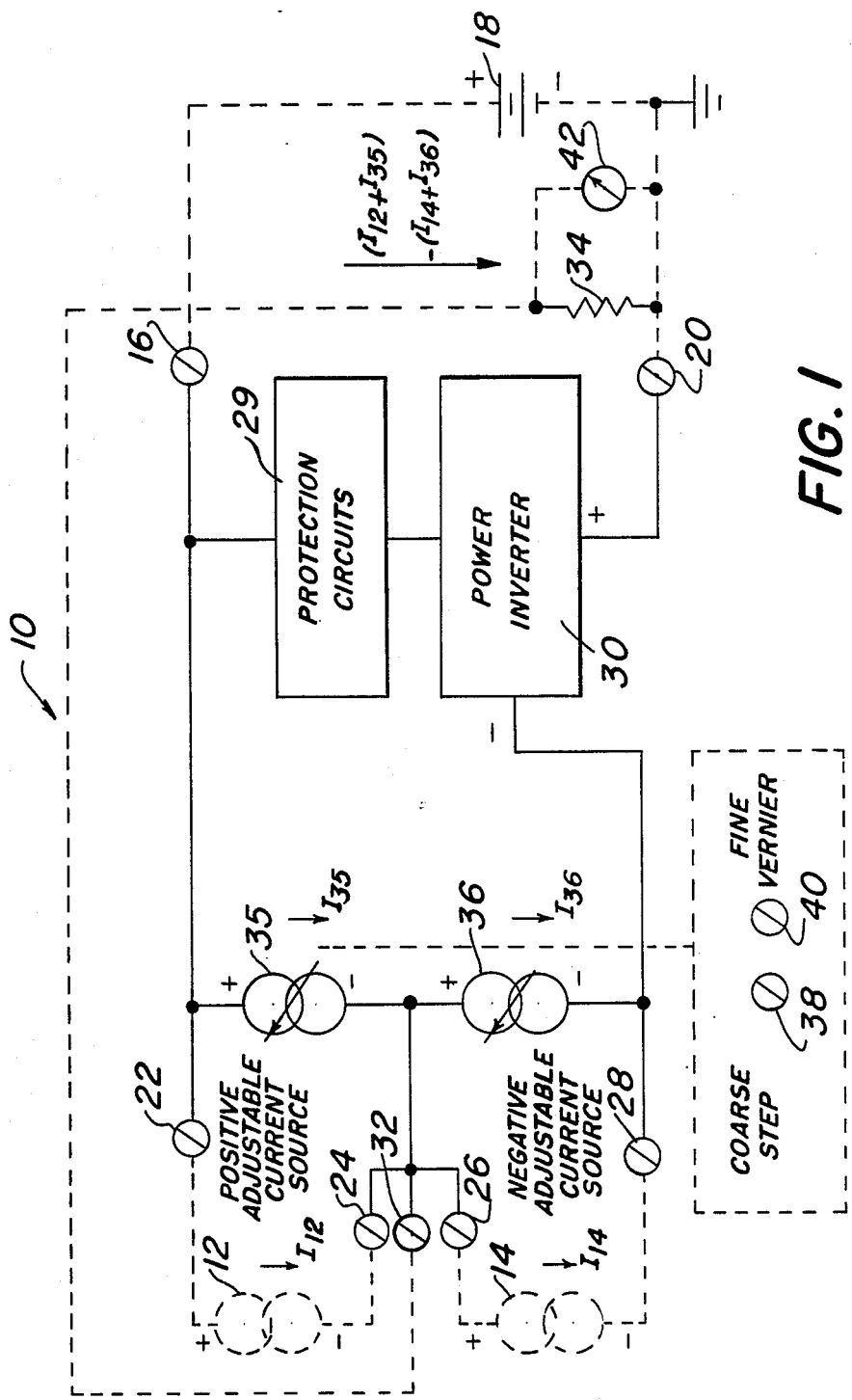
FIG. 1 is a simplified circuit diagram of the signal conditioning circuit of the present invention.

Referring to FIG. 1, a signal conditioning circuit 10 for conditioning the signals received from a current transmitter 12 or a pair of current transmitters 12 and 14 (shown in phantom). The current transmitters 12 and 14 typically produce an output signal in the range of 4 to 20 mA as controlled by a sensing device (not shown). The circuit preferably includes 8 electrical terminals to which input and output connections can be made. Terminal 16 is designed to be connected to the positive terminal of a direct current power supply 18 (shown in phantom). A negative terminal of the power supply 18 is designed to be connected to a system common or ground terminal 20. Although in theory the system of the present invention could work effectively with a very wide range of voltage from power supply 18, in the preferred embodiment of the present invention the power supply 18 should produce a direct current voltage between 8.6 and 45 volts. Terminal 22 is designed to be connected to the positive lead from the first transmitter 12 and terminal 24 is designed to be connected to the negative lead from transmitter 12. Likewise terminal 26 is designed to be connected to the positive lead from second transmitter 14 and terminal 28 is designed to be connected to the negative lead from transmitter 14. Terminal 22 is also directly connected to terminal 16. Overvoltage and short-circuit protection circuits 29 are connected to terminal 16. A power inverter circuit 30 is connected to protection circuits 29 and terminal 20 for generating an output signal of equal magnitude but opposite polarity to the signal received from circuits 29 and delivering such an output signal to terminal 28. An output terminal 32 is designed to be connected to an electrical resistance 34 (shown in phantom). The other terminal of the electrical resistance 34 is designed to be connected to terminal 20. Although, in the preferred embodiment of the present invention the electrical resistance 34 is designed to be connected externally to the circuit, it is within the scope of this invention to include a variable resistance in the circuit to accomplish this same end. Finally, an adjustment mechanism is provided which is connected to terminal 32 and also terminals 22 and 28 to thereby receive the output signal from inverter 30 and adjust the scale of the signal received at terminals 22 and 24 to a desired scale when operating in a first mode. Operating in a second mode the adjustment means delivers an output signal to terminal 32 proportional to the difference between the signals received at terminals 22 and 24 and 26 and 28 respectively. The adjustment means is a pair of adjustable current sources 35 and 36 of opposite polarity. The current sources 35 and 36 are simultaneously adjustable by means of a course adjustment screw 38 and a fine adjustment screw 40. The current sources 35 and 36 are connected in series between terminal 16 and the negative output of power inverter 30 with the positive terminal of current source 35 being connected to terminals 16 and 22 and the negative terminal of current source 35 being connected to terminals 24, 32, and 26 and the positive terminal of current source 35. The negative terminal of current source 35 is connected to terminal 28 and the negative terminal of power inverter 30. Thus current transmitter 12 is adapted to be connected in parallel with adjustable current source 35 and transmitter 14 is adapted to be connected in parallel with adjustable current source 36.

In operating the signal conditioning circuit of the present invention, it is first necessary for the operator to calibrate the circuit to achieve a desired output voltage reading for the lowest desired input current. In order to accomplish this calibration the operator would apply a fixed known direct current voltage in the desired range, for example, 24 volts, to input terminals 16 and 20. A known resistance, for example 250 Ohms, is then connected across terminals 20 and 32. Since the output voltage $V_0$ is taken across resistance 34 (output terminals 20 and 32) the operator need only apply Ohms Law to obtain the desired current adjustment in accord with the following relationship:

$$I_d \times R = V_0$$

Where
  $V_0$ = the output voltage on terminals 20 and 32 in volts
  R = the resistance in Ohms of resistor 34
  $I_d$ = the desired output current in amperes of the unit in the absence of any input signal on terminals 22 and 24 or terminals 26 and 28.

Within the limits of the capabilities of the circuit 10, the operator may then adjust the desired current in accordance with the nature of the input signal to be applied to terminals 22 and 24 and/or terminals 26 and 28. For example, typical current transmitters used to transmit a signal from a sensing device transmit a signal in the range of 4 to 20 mA. Examples of such transmitters are those manufactured by Hy-Cal Engineering, a Unit of General Signal Corporation, under Model Numbers CT807, CT801 and CT827C. A suitable voltmeter 42 (shown in phantom) is connected across resistance 34. If the operator wished to shift the input signal so that an input signal of 4 mA would yield no output voltage then the operator would calibrate the circuit 10 to generate an output current of negative 4 mA in the absence of an input signal. Using the above example, if a resistance of 250 Ohms were chosen and if the desired output current were −0.004 A then the operator would adjust the controls 38 and 40 until an output voltage of −1 V was obtained across terminals 32 and 20. The circuit 10 could be similarly adjusted across a broad range of currents. In the preferred embodiment of the present invention the adjustment range of the circuit 10 permits the circuit to be adjusted in a similar manner from +4 mA to −20 mA.

In addition, by proper selection of the resistance 34, the operator may tailor the circuit of the present invention to yield an output voltage reading in a desired range. For example, if a typical transmitter as discussed above with a 16 mA range were coupled to a sensor having a range of 90 Units (where U would represent units of temperature, pressure, etc.), then in this example, it is clear that 0.0001778 amp is equivalent to 1 U. Furthermore, if, for example, it were desired that an output voltage $V_0$ of 0.01 V DC be representative of a single U then the resistance 34 may be determined by the simple calculation:

0.01 V dc/U/0.0001778A/U = 56.25 Ohms

If transmitting devices 12 and 14 are connected to terminals 22 and 24 and 26 and 28 respectively as shown in FIG. 1, then the circuit 10 will operate as a differential circuit. Circuit 10 will deliver an output current to terminal 32 proportional to the difference in the currents received from the transmitters 12 and 14. Once again the actual amount of output voltage will be dependent upon the selection of the resistance 34 in accord with the method discussed above.

As is clear from FIG. 1, where the illustrated current flow is conventional current flow, when a transmitter 14 is connected to terminals 26 and 28, the circuit 10 will deliver an output current to resistance 34 representative of the difference in outputs from transmitters 12 and 14. This is so because the current flowing in resistance 34 is equal to the difference between the sum of the currents in transmitter 12 and current source 35 and the sum of the currents in transmitter 14 and current source 36 i.e. $I_{34} = (I_{12} + I_{35}) - (I_{14} + I_{36})$.

Figure 2:
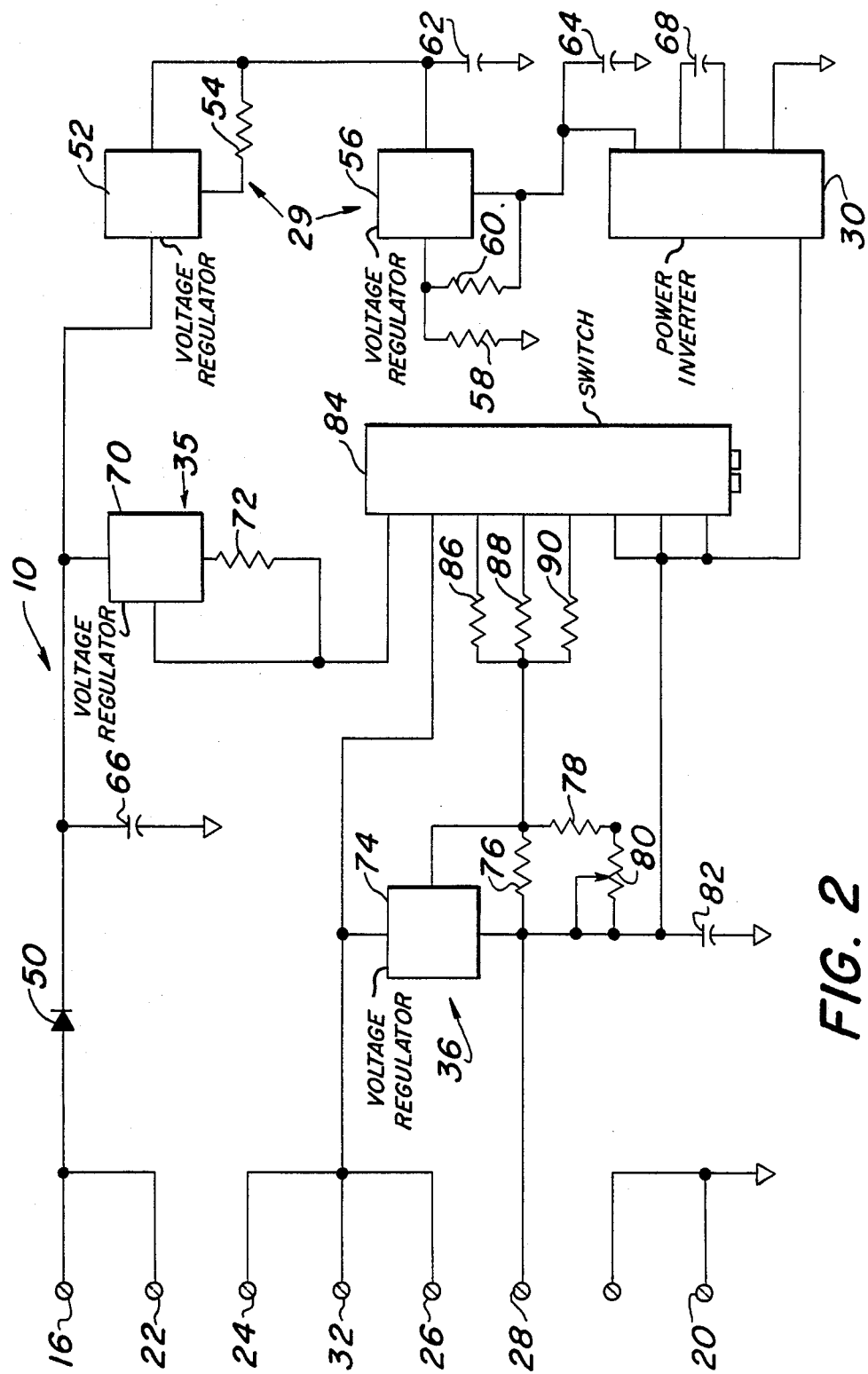
FIG. 2 is a detailed circuit diagram of the signal conditioning circut of the present invention.

The circuit 10 is shown in detail in FIG. 2. Power terminal 16 and sensor terminal 22 are connected to a diode 50 and to protection circuitry 29. Protection circuitry 29 first includes a short circuit protection circuit including a voltage regulator 52 and a resistor 54. The voltage regulator 52 is in turn connected to an overvoltage protection circuit including a voltage regulator 56, resistors 58 and 60, and capacitors 62 and 64. The voltage regulators 52 and 56 are preferably of the type manufactured by National Semiconductor under the Model No. LM317LZ. The diode 50 is also connected to a capacitor 66. The voltage regulator 56 is connected to the inverter circuit 30 which also includes an externally connected capacitor 68. The voltage regulator 56 preferably limits the voltage delivered to inverter circuit 30 to 20 VDC. The inverter circuit 30 is preferably of the type manufactured by Siliconix under Model No. Si7661CJ. The positive adjustable current source 35 is also connected to the diode 50 and includes an adjustable voltage regulator 70 and a resistor 72. The negative adjustable current source 36 is connected to terminals 24, 26, and 32 and includes an adjustable voltage regulator 74 having fixed resistors 76, and 78, variable resistor 80, and capacitor 82 connected thereto. The adjustable voltage regulators 70 and 74 are preferably of the type manufactured by National Semiconductor under Model No. LM317MT. Controlling the adjustable current sources is a switch 84 having resistors 86, 88 and 90 connected thereto. The switch 84 is also connected to voltage regulators 70 and 74 and capacitor 82 and in accord with adjustments made by the operator, to adjustment screw 38, serve to connect and disconnect the positive current source 35 from the negative current source 36 and also to connect and disconnect in various combinations the resistors 86, 88 and 90 to and from the capacitor 82. Adjustment of the fine screw control 40 by the operator serves to adjust the variable resistor 80. The switch 84 is preferably a hexidecimal binary coded switch manufactured under Model No. 53137-5 by AMP Corporation. The variable resistor 80 is preferably a 1000 Ohm potentiometer manufactured by the Bourns Company under Model No. 306P-1-102. The following is a list of other preferred component values:
  Resistor 76: 200 Ohms
  Resistor 78: 348 Ohms
  Resistor 58: 4.53K Ohms Resistor 60: 316 Ohms
Resistor 90: 845 Ohms
Resistor 88: 422 Ohms
Resistor 86: 210 Ohms
Resistor 72: 107 Ohms
Resistor 54: 25.5 Ohms
Capacitors 68 and 82: 10 micro farads
Capacitors 66, 62 and 64: 0.1 micro farads.

Accordingly, it is clear that the present invention provides a signal conditioning circuit which is capable of shifting a direct current input signal to a desired output range. It is further clear that the circuit of the present invention may be easily calibrated by the operator to obtain the desired range of voltage output. Furthermore the circuit of the present invention is capable of developing an output signal equal to the difference of two input signals. Finally, the circuit of the present invention is relatively simple in construction and inexpensive to manufacture.

While there has been described what is at the present considered to be the ppreferred embodiment of the present invention, it will be obvious to those skilled in the art that various changes and modifications may be made therein without departing from the invention, and it is, therefore, aimed in the appended claims to cover all such changes and modifications as fall within the true spirit and scope of the present invention.

What we claim is:

1. A signal conditioning circuit comprising:
   power terminal means adapted to be connected to a direct current power source;
   sensor terminal means adapted to receive a direct current signal;
   output terminal means adapted to be connected to an electrial resistance;
   inverter means connected to said power terminal means for generating an output signal of opposite polarity to the signal received at said power terminal means; and
   adjustment means connected to said sensor terminal means, said inverter means, said power terminal means and said output terminal means for receiving said inverter output signal and for shifting the scale of the signal received at said sensor terminal means to a desired scale at said output terminal means.

2. A signal conditioning circuit as set forth in claim 1 wherein said adjustment means comprises a pair of adjustable current sources of opposite polarity.

3. A signal conditioning circuit as set forth in claim 2 wherein said current sources are simultaneously adjustable.

4. A signal conditioning circuit as set forth in claim 2 wherein the output from each current source is connected to said output terminal means.

5. A signal conditioning circuit as set forth in claim 4 wherein one of said current sources is further connected to said power terminal means and the other of said current sources is further connected to the output of said inverter means to receive the output signal therefrom.

6. A signal conditioning circuit as set forth in claim 1 further including means for protecting against a short circuit, said short circuit protection means being connected to said power terminal means.

7. A signal conditioning circuit comprising:
   power terminal means adapted to be connected to a direct current power source;
   first and second sensor terminal means each adapted to receive a direct current signal;
   output terminal means adapted to be connected to an electrical resistance;
   inverter means connected to said power terminal means for generating an output signal of opposite polarity to the signal received at said power terminal means; and
   adjustment means connected to said sensor terminal means, said inverter means, said power terminal means and said output terminal means and operable in a first mode for receiving said inverter output signal and adjusting the scale of the signal received at said first sensor terminal means to a desired scale at said output terminal means and operable in a second mode for delivering an output signal at said output terminal means proportional to the difference between the signals received at said first and second sensor terminal means.

8. A signal conditioning circuit as set forth in claim 7 wherein said adjustment means comprises a pair of adjustable current sources of opposite polarity.

9. A signal conditioning circuit as set forth in claim 8 wherein said current sources are simultaneously adjustable.

10. A signal conditioning circuit as set forth in claim 8 wherein the output from each current source is connected to said output terminal means.

11. A signal conditioning circuit as set forth in claim 10 wherein one of said current sources is further connected to said power terminal means and the other of said current sources is further connected to the output of said inverter means to receive the output signal therefrom.

12. A signal conditioning circuit as set forth in claim 7 further including means for protecting against a short circuit, said short circuit protection means being connected to said power terminal means.

13. In a circuit for measuring the output from a current transmitter, a direct current power source connected to said current transmitter, and an electrical resistance connected to said current transmitter for receiving the current signal therefrom and developing a proportional output to voltage signal, the improvement comprising:
   an inverter circuit connected to said power source for developing an output voltage of opposite polarity thereto, and a pair of adjustable current sources of opposite polarity connected in series between said power source and said inverter circuit, said current transmitter being connected in parallel with one of said adjustable current sources so that the adjustment of said current sources adjusts the scale of the current signal delivered to said electrical resistance.

14. A measuring circuit as set forth in claim 13 further including a second current transmitter, said second current transmitter being connected in parallel with the other of said adjustable current sources so that the adjustment of said current sources adjusts the scale of the difference between the current signals from said current transmitters.

* * * * *